United States Patent
Tan (10) Patent No.: US 8,868,281 B2
(45) Date of Patent: Oct. 21, 2014

(54) UNDERSTEER ASSESSMENT FOR VEHICLES

(75) Inventor: Hualin Tan, Novi, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 968 days.

(21) Appl. No.: 12/914,691

(22) Filed: Oct. 28, 2010

(65) Prior Publication Data

US 2012/0109445 A1    May 3, 2012

(51) Int. Cl.
```
G01M 17/00    (2006.01)
G06F 7/00     (2006.01)
G06F 11/30    (2006.01)
G06F 19/00    (2011.01)
G07C 5/00     (2006.01)
B60T 8/24     (2006.01)
G06F 17/00    (2006.01)
G06G 1/00     (2006.01)
B60W 40/114   (2012.01)
B60T 8/1755   (2006.01)
B60W 40/103   (2012.01)
B60W 30/02    (2012.01)
```

(52) U.S. Cl.
CPC ....... *B60W 40/103* (2013.01); *B60W 2510/207* (2013.01); *B60T 2270/304* (2013.01); *B60W 2540/18* (2013.01); *B60W 40/114* (2013.01); *B60W 2520/105* (2013.01); *B60W 30/02* (2013.01); *B60T 8/17551* (2013.01); *B60W 2520/28* (2013.01); *B60W 2540/12* (2013.01)
USPC .............................. 701/29.2; 701/72; 180/282

(58) Field of Classification Search
CPC ................... B60T 18/17751; B60T 2270/304; B60W 40/103; B60W 40/114; B60W 30/02; B60W 2540/18; B60W 2540/12; B60W 2520/28; B60W 2520/105; B60W 10/207

USPC ............... 180/6.2–6.24, 9.38, 233–234, 400, 180/408–417, 282; 701/29.1–29.2, 41–44, 701/400–541, 72; 702/183–185
See application file for complete search history.

(56) References Cited

U.S. PATENT DOCUMENTS

| | | | | |
|---|---|---|---|---|
| 5,281,012 | A * | 1/1994 | Binder et al. | 303/113.5 |
| 5,305,218 | A * | 4/1994 | Ghoneim | 701/72 |
| 6,439,045 | B1 * | 8/2002 | Latarnik et al. | 73/146.5 |
| 2004/0262067 | A1 * | 12/2004 | Sawada et al. | 180/282 |
| 2005/0189161 | A1 * | 9/2005 | Zheng et al. | 180/402 |
| 2011/0071726 | A1 * | 3/2011 | Bechtler et al. | 701/34 |

FOREIGN PATENT DOCUMENTS

DE    19733674 A1    2/1999

OTHER PUBLICATIONS

State Intellectual Property Office of the People's Republic of China, Office Action dated Oct. 22, 2013 for Chinese Patent Application No. 201110333893.8, only p. 4 was considered. The rest was not considered because not in English.

* cited by examiner

*Primary Examiner* — Khoi Tran
*Assistant Examiner* — Abby Lin
(74) *Attorney, Agent, or Firm* — Ingrassia Fisher & Lorenz, P.C.

(57) ABSTRACT

Methods and systems are provided for assessing understeer for a vehicle having at least one rear wheel and at least one front wheel. Rear wheel speeds are measured from the rear wheels, and front wheel speeds are measured for the front wheels. A determination is made as to the understeer of the vehicle using a comparison of the front wheel speeds and the rear wheel speeds.

20 Claims, 5 Drawing Sheets

UNDERSTEER ASSESSMENT FOR VEHICLES

TECHNICAL FIELD

The technical field generally relates to the field of vehicles and, more specifically, to methods and systems for assessing understeer for vehicles.

BACKGROUND

Automobiles and various other vehicles include various control units for controlling various aspects of the vehicle operation. For example, many vehicles include a steering system, a braking system, a stability control system, and other vehicle control systems. The operation of such vehicle control systems may depend on, among other variables, whether the vehicle is experiencing an understeer condition. A dynamic understeer condition refers to the situation when the vehicle is not turning as expected from the driver's steering inputs, and it is an important concept in vehicle handling and vehicle stability control. However, existing determinations of understeer conditions rely upon calculations at the vehicle level that may be influenced by the understeer condition. In some vehicles, an understeer condition is determined by comparing to a calculated reference yaw rate to the sensor measured yaw rate. In certain other vehicles, vehicle side slip angle is used to determine an understeer condition. However, the calculation of the reference yaw rate and that of vehicle side slip angle may depend upon (among other variables) vehicle speed, which may be influenced by the understeer condition itself. Therefore, the understeer determination results in existing techniques may be skewed.

Accordingly, it is desirable to provide an improved method for assessing understeer for a vehicle. It is also desirable to provide improved program products and systems for assessing understeer for a vehicle.

Furthermore, other desirable features and characteristics of the present invention will be apparent from the subsequent detailed description and the appended claims, taken in conjunction with the accompanying drawings and the foregoing technical field and background.

BRIEF SUMMARY

In accordance with an exemplary embodiment, a method for assessing understeer of a vehicle having at least one front wheel and at least one rear wheel is provided. The method comprises the steps of measuring a rear wheel speed for the at least one rear wheel, measuring a front wheel speed for the at least one front wheel, and determining, via a processor, whether the understeer is present using a comparison of the front wheel speed and the rear wheel speed.

In accordance with another exemplary embodiment, a program product for assessing understeer of a vehicle having a plurality of front wheels and a plurality of rear wheels is provided. The program product comprises a program and a non-transitory computer readable medium. The program is configured to measure rear wheel speeds for the plurality of rear wheels and front wheel speeds for the plurality of front wheels, and determine whether the understeer is present using a comparison of the front wheel speeds and the rear wheel speeds. The non-transitory computer readable medium bears the program and contains computer instructions stored therein for causing a computer processor to execute the program.

In accordance with a further exemplary embodiment, a system for assessing understeer of a vehicle having a plurality of front wheels and a plurality of rear wheels is provided. The system includes a plurality of sensors and a processor. The plurality of sensors is configured to measure rear wheel speeds for the plurality of rear wheels and front wheel speeds for the plurality of front wheels. The processor is coupled to the plurality of sensors, and is configured to determine whether the understeer is present using a comparison of the front wheel speeds and the rear wheel speeds.

BRIEF DESCRIPTION OF THE DRAWINGS

The present disclosure will hereinafter be described in conjunction with the following drawing figures, wherein like numerals denote like elements, and wherein.

DETAILED DESCRIPTION

The following detailed description is merely exemplary in nature, and is not intended to limit the disclosure or the application and uses thereof. Furthermore, there is no intention to be bound by any theory presented in the preceding background or the following detailed description.

Figure 1:
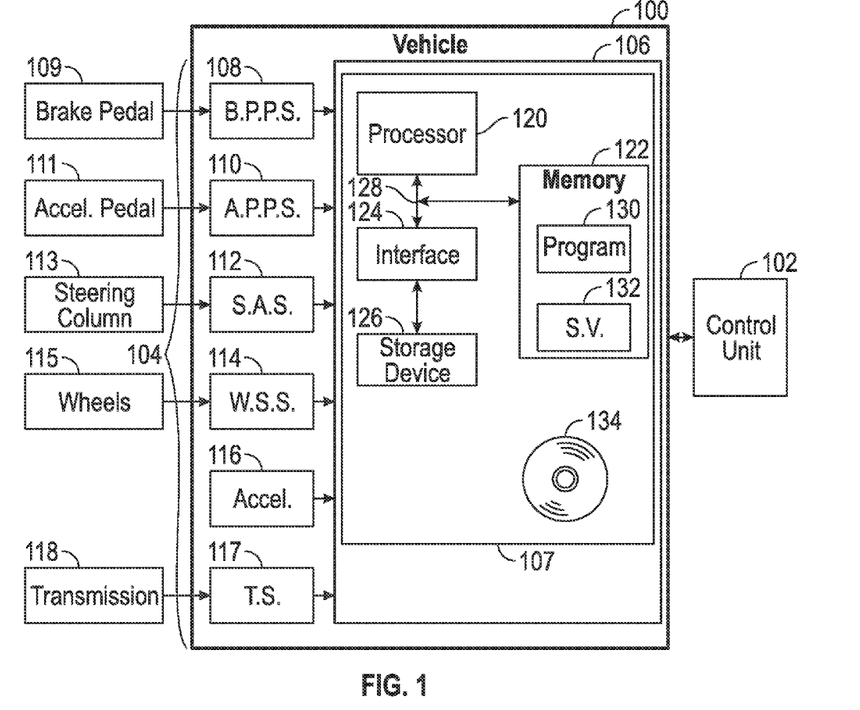
FIG. 1 is a functional block diagram of a control system for a vehicle control unit that is configured to determine understeer and control one or more functions for a vehicle, such as an automobile, in accordance with an exemplary embodiment.

FIG. 1 is a block diagram of an exemplary control system 100 for use in a vehicle control unit 102 of a vehicle. In one example, the vehicle comprises an automobile, such as a sedan, a sport utility vehicle, a van, or a truck. However, the type of vehicle may vary. The vehicle control units 102 may comprise any number of different types of units, modules, and/or systems of the vehicle, such as, by way of example only, a braking system, a steering system, a stability control system, and the like.

As depicted in FIG. 1, the control system 100 includes a plurality of sensors 104 and a controller 106. The sensors 104 include one or more brake pedal position sensors 108, accelerator pedal position sensors 110, steering angle sensors 112, wheel speed sensors 114, accelerometers 116, and transmission sensors 117. The measurements and/or information from the sensors 104 are provided to the controller 106 for processing and for determination of understeer for the vehicle and for ultimate use in controlling one or more vehicle functions, such as vehicle braking, steering, and stability control.

The brake pedal position sensor 108 is coupled between a brake pedal 109 of the vehicle and the controller 106. The brake pedal position sensor 108 measures a position of the brake pedal 109 or an indication as to how far the brake pedal 109 has traveled when the operator applies force to the brake pedal 109. Specifically, the brake pedal position sensor 108 measures a position of the brake pedal and provides information pertaining thereto to the processor 120 for processing and for subsequent use in determining understeer for the vehicle.

The accelerator pedal position sensor 110 is coupled between an accelerator pedal 111 of the vehicle and the controller 106. The accelerator pedal position sensor 110 provides an indication of a position of the accelerator pedal 111 or an indication as to how far the accelerator pedal 111 has traveled when the operator applies force to the accelerator pedal. Specifically, the accelerator pedal position sensor 110 preferably measures a position of the accelerator pedal 111 and provides information pertaining thereto to the processor 120 for processing and for use in determining understeer for the vehicle.

The steering angle sensor 112 is coupled between a steering column 113 of the vehicle and the controller 106. The steering angle sensor 112 measures an angular position of the steering column 113 or an indication as to how far the steering column 113 is turned when the operator applies force to a steering wheel of the steering column 113. Specifically, the steering angle sensor 112 measures an angle of the steering wheel and/or another portion of the steering column 113 and provides information pertaining thereto to the processor 120 for processing and for subsequent use in determining understeer for the vehicle.

The wheel speed sensors 114 are coupled between one or more wheels 115 of the vehicle and the controller 106. The wheel speed sensors 114 measure wheel speeds of the wheels 115 while the vehicle is being operated. Preferably, each wheel speed sensor 114 measures a speed (or velocity) of a different respective wheel 115 and provides information pertaining thereto to the processor 120 for processing and for subsequent use in determining understeer for the vehicle.

In certain examples, the sensors 104 may also include one or more accelerometers 116 and transmission sensors 117. The accelerometers 116, if any, measure an acceleration of the vehicle. Specifically, in one example, an accelerometer 116 measures a longitudinal acceleration of the vehicle and provides information pertaining thereto to the processor 120 for processing and for subsequent use in determining understeer for the vehicle. However, in another example, the vehicle acceleration (e.g., longitudinal acceleration) is instead calculated by the processor 120 using the wheel speed values obtained from the wheel speed sensors 114.

The transmission sensors, 117, if any, are coupled between a transmission 118 of the vehicle and the controller 106. The transmission sensors 117 detect an operating mode of the vehicle, for example whether the vehicle is in an accelerating mode (e.g. if the vehicle is in a forward "drive" gear, as opposed to reverse or neutral) and provide information pertaining thereto to the processor 120 for processing and for subsequent use in determining understeer for the vehicle.

The controller 106 is coupled between the sensors 104 and the vehicle control units 102. As depicted in FIG. 1, the controller 106 preferably includes a computer system 107. The controller 106 (and preferably a processor 120 of the computer system 107 thereof) processes the information provided by various combinations of the sensors 104 of FIG. 1 and determines, using this information, whether the vehicle is experiencing understeer. The controller 106 (and preferably a processor 120 of the computer system 107 thereof) preferably provides the understeer determination to the vehicle control unit 102 for use in one or more aspects of vehicle control.

In one example, the vehicle control unit 102 comprises a braking system, and the controller 106 (and preferably a processor 120 of the computer system 107 thereof) provides the understeer determination to the braking system for use in controlling and/or adjusting braking for the vehicle. In another example, the vehicle control unit 102 comprises a steering system, and the controller 106 (and preferably a processor 120 of the computer system 107 thereof) provides the understeer determination to the steering system for use in controlling and/or adjusting steering for the vehicle. In yet another example, the vehicle control unit 102 comprises a stability control system, and the controller 106 (and preferably a processor 120 of the computer system 107 thereof) provides the understeer determination to the stability control system for use in stabilizing the vehicle as appropriate. It will similarly be appreciated that the controller 106 may utilize the understeer determination in various different manners in connection with one or more other different vehicle control units 102 and/or in implementing control and/or adjustment of one or more other different functions pertaining to operation of the vehicle.

As depicted in FIG. 1, the controller 106 comprises a computer system 107. In certain examples, the controller 106 may also include one or more of the sensors 104, among other possible variations. In addition, it will be appreciated that the controller 106 may otherwise differ from the depiction of FIG. 1, for example in that the controller 106 may be coupled to or may otherwise utilize one or more remote computer systems and/or other control systems.

The computer system 107 is coupled between the sensors 104 and the vehicle control units 102. The computer system 107 receives signals or information pertaining to various measurements relating to the sensors 104 (such as brake pedal position, accelerator pedal position, steering angle, wheel speeds, vehicle acceleration, and vehicle mode values). The computer system 107 further processes these signals or information in order to calculate the understeer for the vehicle and for controlling or adjusting one or vehicle functions pertaining to operation of the vehicle. These and other steps are preferably conducted in accordance with the process 200 depicted in FIGS. 2-4 and described further below in connection therewith.

As depicted in FIG. 1, the computer system 107 includes a processor 120, a memory 122, an interface 124, a storage device 126, and a bus 128. The processor 120 performs the computation and control functions of the computer system 107 and the controller 106, and may comprise any type of processor or multiple processors, single integrated circuits such as a microprocessor, or any suitable number of integrated circuit devices and/or circuit boards working in cooperation to accomplish the functions of a processing unit. During operation, the processor 120 executes one or more programs 130 contained within the memory 122 and, as such, controls the general operation of the controller 106 and the computer system 107, preferably in executing the steps of the processes described herein, such as the process 200 depicted in FIGS. 2-4 and described further below in connection therewith.

The memory 122 stores the above-referenced program 130 along with one or more stored values 132 that are used in calculating understeer and/or controlling vehicle functions, in accordance with steps of the process 200 depicted in FIGS.

2-4 and described further below in connection therewith. The memory 122 can be any type of suitable memory. This would include the various types of dynamic random access memory (DRAM) such as SDRAM, the various types of static RAM (SRAM), and the various types of non-volatile memory (PROM, EPROM, and flash). In certain examples, the memory 122 is located on and/or co-located on the same computer chip as the processor 120. It should be understood that the memory 122 may be a single type of memory component, or it may be composed of many different types of memory components. In addition, the memory 122 and the processor 120 may be distributed across several different computers that collectively comprise the computer system 107. For example, a portion of the memory 122 may reside on a computer within a particular apparatus or process, and another portion may reside on a remote computer off-board and away from the vehicle.

The interface 124 allows communication to the computer system 107, for example from a system driver and/or another computer system, and can be implemented using any suitable method and apparatus. It can include one or more network interfaces to communicate with other systems or components. The interface 124 may also include one or more network interfaces to communicate with technicians, and/or one or more storage interfaces to connect to storage apparatuses, such as the storage device 126.

The storage device 126 can be any suitable type of storage apparatus, including direct access storage devices such as hard disk drives, flash systems, floppy disk drives and optical disk drives. In one example, the storage device 126 comprises a program product from which memory 122 can receive a program 130 that executes one or more embodiments of the processes disclosed herein, such as the process 200 of FIGS. 2-4 or portions thereof. Alternatively, the program product may be directly stored in and/or otherwise accessed by the memory 122 and/or a disk (e.g., disk 134) such as that referenced below.

The bus 128 serves to transmit programs, data, status and other information or signals between the various components of the computer system 107. The bus 128 can be any suitable physical or logical means of connecting computer systems and components. This includes, but is not limited to, direct hard-wired connections, fiber optics, infrared and wireless bus technologies. During operation, the program 130 is stored in the memory 122 and executed by the processor 120.

It will be appreciated that while a fully functioning computer system is depicted, those skilled in the art will recognize that the elements thereof may be capable of being distributed as a program product in a variety of forms and/or in connection with one or more types of computer-readable signal bearing media used to store the program and the instructions thereof and carry out the distribution thereof, such as a non-transitory computer readable medium bearing the program and containing computer instructions stored therein for causing a computer processor (such as the processor 120) to perform and execute the program. Examples of such media may include: recordable media such as floppy disks, hard drives, memory cards and optical disks, and transmission media such as digital and analog communication links. It will similarly be appreciated that the computer system 107 may also otherwise differ from the depiction in FIG. 1, for example in that the computer system 107 may be coupled to or may otherwise utilize one or more remote computer systems and/or other control systems.

Figure 2:
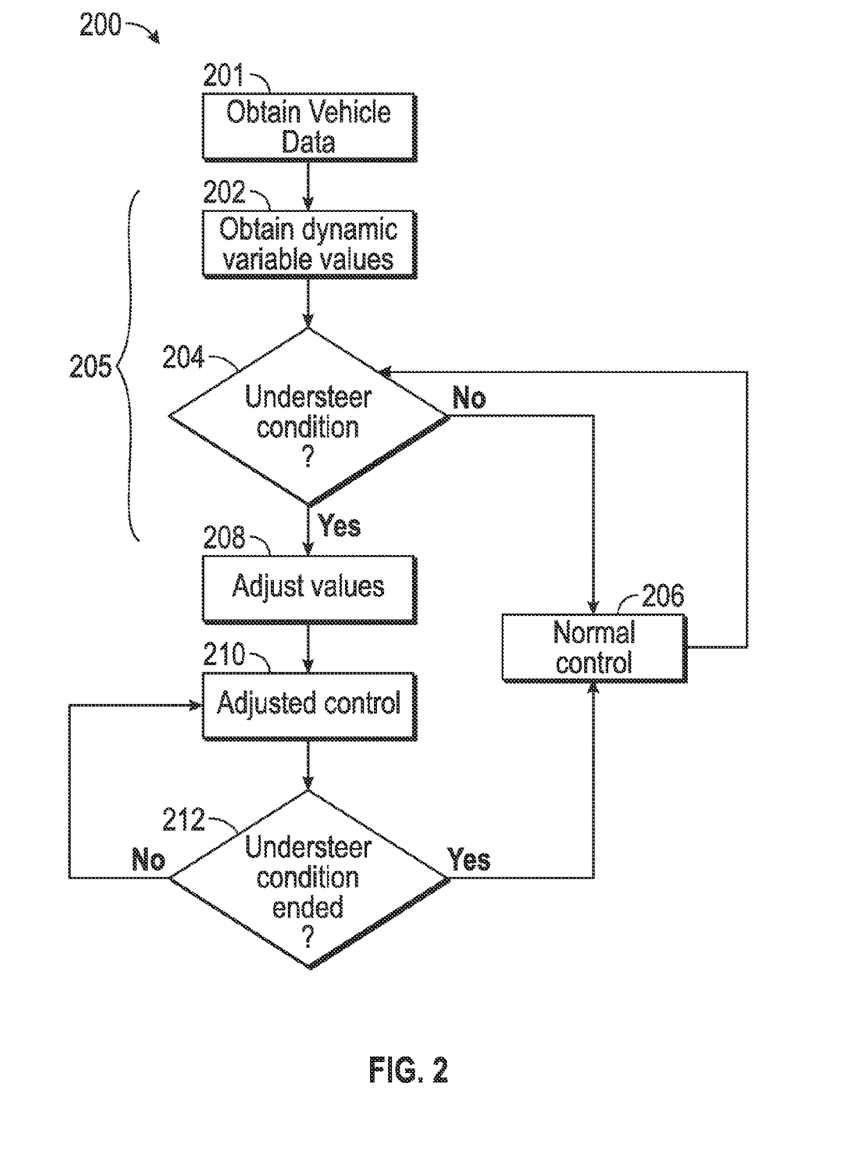
FIG. 2 is a flowchart of a process for determining understeer and controlling one or more functions for a vehicle, such as an automobile, and that can be utilized in connection with the control system of FIG. 1, in accordance with an exemplary embodiment.

FIG. 2 is a flowchart of a process 200 for determining understeer and controlling functions for a vehicle, in accordance with an exemplary embodiment. The process 200 can be implemented in connection with the control system 100 of FIG. 1, the sensors 104, the controller 106, and/or the computer system 107 of FIG. 1.

As depicted in FIG. 2, the process 200 begins with the step of obtaining vehicle data (step 201). Preferably, during step 201, brake pedal data is obtained by the processor 120 of FIG. 1 from the brake pedal position sensor 108 of FIG. 1 regarding a position and/or movement of the brake pedal 109 of FIG. 1, accelerator pedal data is obtained by the processor 120 from the accelerator pedal position sensor 110 of FIG. 1 regarding a position and/or movement of the accelerator pedal 111 of FIG. 1, steering angle data is obtained by the processor 120 from the steering angle sensor 112 of FIG. 1 regarding an angle and/or angular movement of a steering wheel and/or one or more other components of the steering column 113 of FIG. 1, and wheel data is obtained by the processor 120 from one or more wheel speed sensors 114 of FIG. 1 regarding velocity and/or movement one or more of the wheels 115 of FIG. 1. In addition, in certain examples, accelerometer data is obtained by the processor 120 from one or more accelerometers 116 of FIG. 1 regarding an accelerator of the vehicle (such as a longitudinal acceleration of the vehicle)., and transmission data is obtained by the processor 120 from one or more transmission sensors 117 of FIG. 1 regarding an operating mode of the vehicle (such as whether the vehicle is currently in a "drive" gear).

Values are obtained for one or more dynamic variables (step 202). At least one of the values pertains to a value of a dynamic variable pertaining to the wheels 115 of FIG. 1. Specifically, in one preferred embodiment, values are obtained regarding front wheel speeds, rear wheel speeds, and comparisons therebetween. Other dynamic variables pertaining to the wheels 115 and/or to the vehicle as a whole may also be determined in step 202, such as those described further below in connection with FIG. 3. The values of step 202 are preferably obtained by the processor 120 of FIG. 1 from the sensors 104 of FIG. 1 and/or calculated and/or determined by the processor 120 using information provided thereto by the sensors 104 continuously while the vehicle is being operated.

A determination is made as to whether the vehicle is experiencing an understeer condition (step 204). The determination of step 204 is preferably made by the processor 120 of FIG. 1 using the dynamic variable values of step 204 continuously while the vehicle is being operated. In one example, the processor 120 compares one or more of the dynamic variable values of step 204 with respective predetermined values that comprise stored values 132 in the memory 122 of FIG. 1 in determining whether the vehicle is experiencing an understeer condition.

Steps 202 (obtaining values for one or more dynamic variable) and 204 (determining whether the vehicle is experiencing an understeer condition) are denoted in FIG. 2 as a combined step 205. One preferred embodiment of this combined step 205 is depicted in FIG. 3, and will be described directly below in connection therewith.

Figure 3:
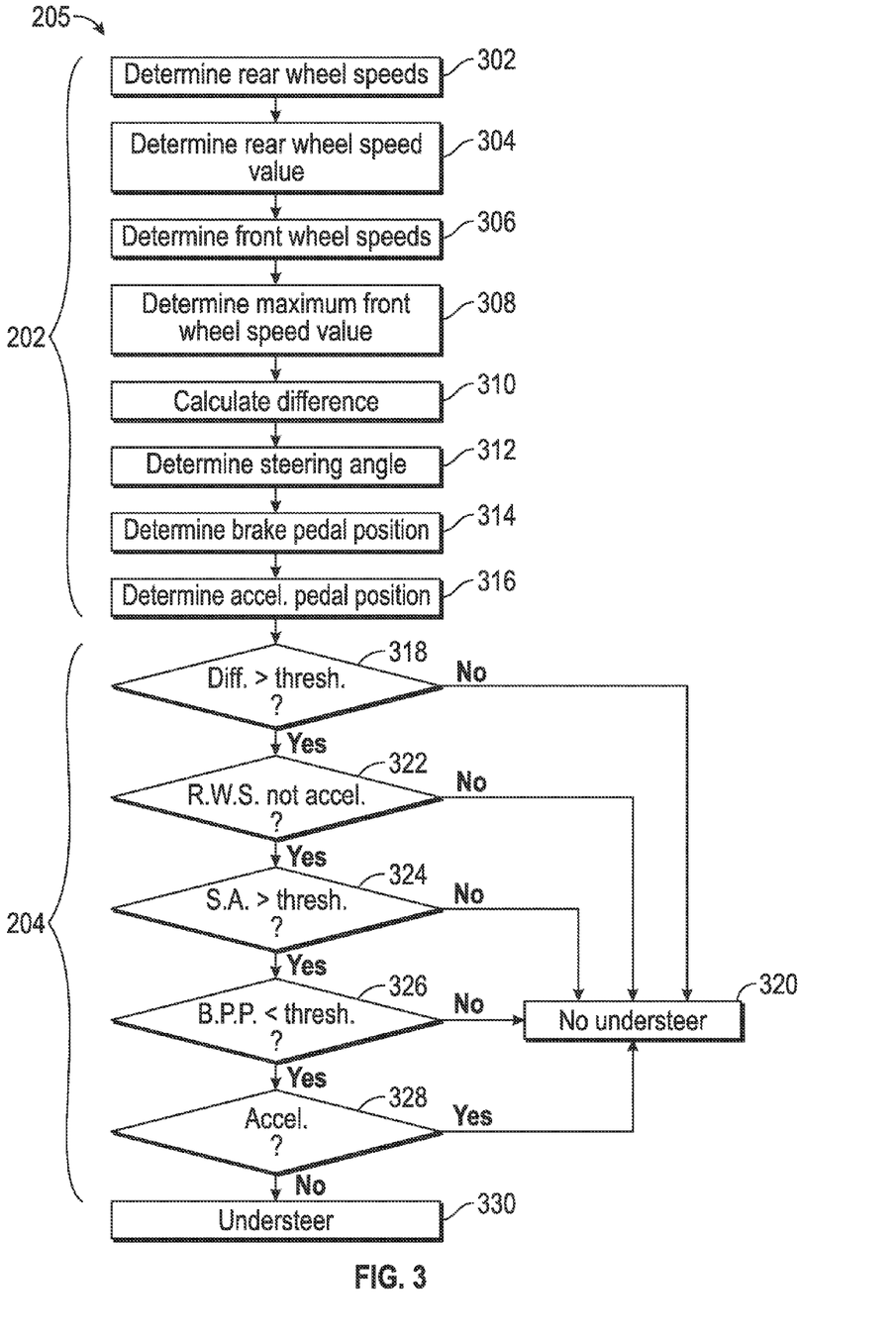
FIG. 3 is a flowchart of a sub-process for a combined step in the process of FIG. 2, namely the combined step of ascertaining dynamic variable values and determining whether a vehicle understeer condition exists for a vehicle, such as an automobile, and that can be utilized in connection with the control system of FIG. 1, in accordance with an exemplary embodiment.

As depicted in FIG. 3, the combined step 205 begins with the step of determining rear wheel speeds for the vehicle (step 302). Specifically, rear wheel speeds are determined for one or more (and preferably all) of the rear wheels of the vehicle. The rear wheel speeds are preferably measured by one or more wheel speed sensors 114 of FIG. 1 and provided to the processor 120 of FIG. 1 for processing. In certain embodiments, the rear wheel speeds may be calculated or otherwise determined by the processor 120 of FIG. 1 using information provided by one or more wheel speed sensors 114 of FIG. 1 and/or by one or more other sensors. In either case, step 302 is preferably performed continuously while the vehicle is being operated.

A minimum rear wheel speed value is determined (step 304). The minimum rear wheel speed value preferably comprises a single, smallest value from the wheel rear wheel speeds of step 302 at a particular point in time or during a particular time interval during a current iteration of step 304. The minimum rear wheel speed value is preferably determined by the processor 120 of FIG. 1 continuously while the vehicle is being operated.

In addition, front wheel speeds are also determined (step 306). Specifically, front wheel speeds are determined for one or more (and preferably all) of the front wheels of the vehicle. The front wheel speeds are preferably measured by one or more wheel speed sensors 114 of FIG. 1 and provided to the processor 120 of FIG. 1 for processing. In certain embodiments, the front wheel speeds may be calculated or otherwise determined by the processor 120 of FIG. 1 using information provided by one or more wheel speed sensors 114 of FIG. 1 and/or by one or more other sensors. In either case, step 306 is preferable performed continuously while the vehicle is being operated.

A maximum front wheel speed value is determined (step 308). The maximum front wheel speed value preferably comprises a single, largest value from the wheel front wheel speeds of step 306 at a particular point in time or during a particular time interval during a current iteration of step 308. The maximum front wheel speed value is preferably determined by the processor 120 of FIG. 1 continuously while the vehicle is being operated.

A difference between the rear wheel speeds and the front wheel speeds is then calculated (step 310). The difference preferably comprises a difference between the minimum rear wheel speed value of step 304 and the maximum front wheel speed value of step 308. The difference is preferably calculated by the processor 120 of FIG. 1 continuously while the vehicle is being operated.

In addition, a steering angle is also determined (step 312). In one preferred embodiment, the steering angle comprises an angle of the steering wheel of the vehicle at a particular point in time or during a particular time interval during a current iteration of step 312. In other embodiments, the steering angle may comprise an angle of another component of the steering column 113 of FIG. 1 at a particular point in time or during a particular time interval during a current iteration of step 312. The steering angle is preferably measured by the steering angle sensor 112 of FIG. 1 and provided to the processor 120 of FIG. 1 for processing. In certain embodiments, the steering angle may be calculated or otherwise determined by the processor 120 of FIG. 1 using information provided by the steering angle sensor 112 of FIG. 1. In either case, step 312 is preferably performed continuously while the vehicle is being operated In addition, a brake pedal position is also determined (step 314). In one preferred embodiment, the brake pedal position comprises a current or most recent position of the brake pedal 109 of FIG. 1 at a particular point in time or during a particular time interval during a current iteration of step 314. In other embodiments, the brake pedal position may comprise another measure of movement and/or travel of the brake pedal 109 at a particular point in time or during a particular time interval during a current iteration of step 314. The brake pedal position is preferably measured by the brake pedal position sensor 108 of FIG. 1 and provided to the processor 120 of FIG. 1 for processing. In certain embodiments, the brake pedal position may be calculated or otherwise determined by the processor 120 of FIG. 1 using information provided by the brake pedal position sensor 108 of FIG. 1. In either case, step 314 is preferably performed continuously while the vehicle is being operated.

An accelerator pedal position is also determined (step 316). In one preferred embodiment, the accelerator pedal position comprises a current or most recent position of the accelerator pedal 111 of FIG. 1 at a particular point in time or during a particular time interval during a current iteration of step 316. In other embodiments, the accelerator pedal position may comprise another measure of movement and/or travel of the accelerator pedal 111 at a particular point in time or during a particular time interval during a current iteration of step 316. The accelerator pedal position is preferably measured by the accelerator pedal position sensor 110 of FIG. 1 and provided to the processor 120 of FIG. 1 for processing. In certain embodiments, the accelerator pedal position may be calculated or otherwise determined by the processor 120 of FIG. 1 using information provided by the accelerator pedal position sensor 110 of FIG. 1. In either case, step 316 is preferably performed continuously while the vehicle is being operated.

As denoted in FIG. 3, steps 302-316, described above, preferably correspond to step 202 from FIG. 2, namely, determining dynamic variable values. The various dynamic variable values are utilized in steps 318-330 in determining whether an understeer condition exists for the vehicle. Also as denoted in FIG. 2, steps 318-330 preferably correspond to step 204 of FIG. 2. Each of steps 318-330 will be described directly below with reference to FIG. 3.

A determination is made as to whether the difference of step 310 (i.e., the difference between the minimum rear wheel speed and the maximum front wheel speed) is greater than a first predetermined speed threshold for a first predetermined amount of time (step 318). These thresholds preferably comprise stored values 132 in the memory 122 of FIG. 1. These determinations are preferably made by the processor 120 of FIG. 1 continuously while the vehicle is being operated. In one preferred embodiment, the first predetermined speed threshold is in a range of between 0.8 meters per second (m/s) and 1.5 m/s, and is most preferably approximately equal to 1.0 m/s. The first predetermined amount of time is in a range of between 100 milliseconds (ms) and 200 ms, and is most preferably approximately equal to 120 ms. However, this may vary.

If it is determined in step 318 that the difference is less than or equal to the first predetermined speed threshold (or that the difference is otherwise not greater than the first predetermined speed threshold for the first predetermined amount of time), then a determination is made that the vehicle is not experiencing an understeer condition (step 320). This determination is preferably made by the processor 120 of FIG. 1 continuously while the vehicle is being operated. Conversely, if it is determined in step 318 that the difference is greater than the first predetermined speed threshold for the first predetermined amount of time, then the process proceeds instead to step 322, described below.

During step 322, a determination is made as to whether the rear wheel speeds of step 302 are not accelerating. This determination is preferably made by the processor 120 of FIG. 1 continuously while the vehicle is being operated. The determination of step 322 is preferably as to whether each of the rear speeds are not accelerating for a second predetermined amount of time. In one preferred embodiment, the second predetermined amount of time is in a range of between 100 ms and 200 ms, and is most preferably approximately equal to 120 ms. However, this may vary. This threshold preferably comprises a stored value 132 in the memory 122 of FIG. 1

If it is determined in step 322 that the rear wheel speeds are accelerating for the second predetermined amount of time, then the process returns to the above-referenced step 320, as a determination is made that the vehicle is not experiencing an understeer condition. Conversely, if it is determined in step 322 that the rear wheel speeds are accelerating for the second predetermined amount of time, then the process proceeds instead to step 324, described below.

During step 324, a determination is made as to whether a steering is greater than a first predetermined steering threshold. The steering angle comprises a hand steering wheel angle directly controlled by the driver, and preferably corresponds to the steering angle of step 312. This determination is preferably made by the processor 120 of FIG. 1 continuously while the vehicle is being operated. The determination of step 324 is preferably as to whether the steering angle of step 312 is greater than a first predetermined steering threshold for at lest a third predetermined amount of time. In one preferred embodiment, the first steering angle is in a range of between 200 degrees and 300 degrees, and is most preferably approximately equal to 240 degrees, and the third predetermined amount of time is in a range of between 100 and 200 ms, and is most preferably approximately equal to 120 ms. However, this may vary. These thresholds preferably comprise stored values 132 in the memory 122 of FIG. 1.

If it is determined in step 324 that the steering angle is less than or equal to the first predetermined steering threshold (or that the steering angle is otherwise not greater than the first predetermined steering threshold for the third predetermined amount of time), then the process returns to the above-referenced step 320, as a determination is made that the vehicle is not experiencing an understeer condition. Conversely, if it is determined in step 324 that the steering angle is greater than the first predetermined steering threshold for the third predetermined amount of time, then the process proceeds instead to step 326, described below.

During step 326, a determination is made as to whether the brake pedal position of step 314 is less than a first braking threshold. This determination is preferably made by the processor 120 of FIG. 1 continuously while the vehicle is being operated. In one preferred embodiment, the first braking threshold is in a range of between ten percent and twenty percent of a maximum braking amount for the braking system (in which one hundred percent would correspond to the brake pedal being engaged fully to the floor of the vehicle), and is most preferably approximately equal to fifteen percent of the maximum braking threshold. However, this may vary. This threshold preferably comprises a stored value 132 in the memory 122 of FIG. 1.

If it is determined in step 326 that the brake pedal position is greater than or equal to the first braking threshold, then the process returns to the above-referenced step 320, as a determination is made that the vehicle is not experiencing an understeer condition. Conversely, if it is determined in step 326 that the brake pedal position is less than the first braking threshold, then the process proceeds instead to step 328, described below.

During step 328, a determination is made as to whether the vehicle is accelerating. This determination is preferably made by the processor 120 of FIG. 1 using the wheel speeds of steps 302, 304 and/or the acceleration values of step 316. In one embodiment, the determination of step 328 is a determination as to whether the vehicle acceleration (as measured by an accelerometer 116 of FIG. 1 or as calculated by wheel speed values measured by wheel speed sensors 114 of FIG. 1) is less than a second acceleration threshold. In another embodiment, the determination of step 328 is a determination as to whether the vehicle is an accelerating mode (for example, a "drive" gear mode, as determined by one or more transmission sensors 117 of FIG. 1). In yet another embodiment, the determination of step 328 is a determination as to whether the acceleration pedal position exceeds a predetermined accelerator pedal position threshold. In either case, step 328 is preferably performed continuously while the vehicle is being operated. In one, the second acceleration threshold is in a range of between 0.1 g and 0.5 g (in which "g" corresponds to the gravity factor, equal to approximately 9.81 meters per second squared), and is most preferably approximately equal to 0.2 g. Also in one embodiment, the acceleration pedal position threshold is in a range of between twenty percent and thirty five percent of a maximum acceleration amount for the vehicle (for example, in which one hundred percent would indicate that the accelerator pedal is fully depressed against the floor of the vehicle), and is most preferably equal to approximately twenty five percent of the maximum acceleration amount. However, this may vary. These thresholds preferably comprise a stored value 132 in the memory 122 of FIG. 1.

If it is determined in step 328 that the vehicle is accelerating, then the process returns to the above-referenced step 320, as a determination is made that the vehicle is not experiencing an understeer condition. Conversely, if it is determined in step 328 that the vehicle is not accelerating, then a determination is made that the vehicle is experiencing an understeer condition (step 330). This determination is preferably made by the processor 120 of FIG. 1.

Returning now to FIG. 2, if it is determined in step 204 that the vehicle is not experiencing an understeer condition (for example, in step 320 of FIG. 3), then various vehicle functions are controlled as normal (step 206). For example, during step 206, the vehicle speed may be calculated using front and rear wheel speed values, and various vehicle functions (such as vehicle braking, steering, and stability control) may be controlled as they normally would in the absence of vehicle understeer. These functions are preferably performed via calculations performed by the processor 120 of FIG. 1 and via instructions provided by the processor 120 of FIG. 1 to the vehicle control units 102 of FIG. 1 that are executed by various non-depicted actuators of the vehicle control units 102 of FIG. 1. The process then returns to step 204, as a new vehicle understeer determination is made at a subsequent time in a new iteration.

Conversely, if it is determined in step 204 that the vehicle is experiencing an understeer condition (for example, in step 330 of FIG. 3), then various vehicle variable values may be adjusted (step 208). Specifically, during step 208, the vehicle speed may be calculated using only the front wheel speed values, because the rear wheel speeds may represent an inaccurate reflection of the vehicle speed during vehicle understeer. Such adjustments are preferably implemented by the processor 120 of FIG. 1.

Figure 5:
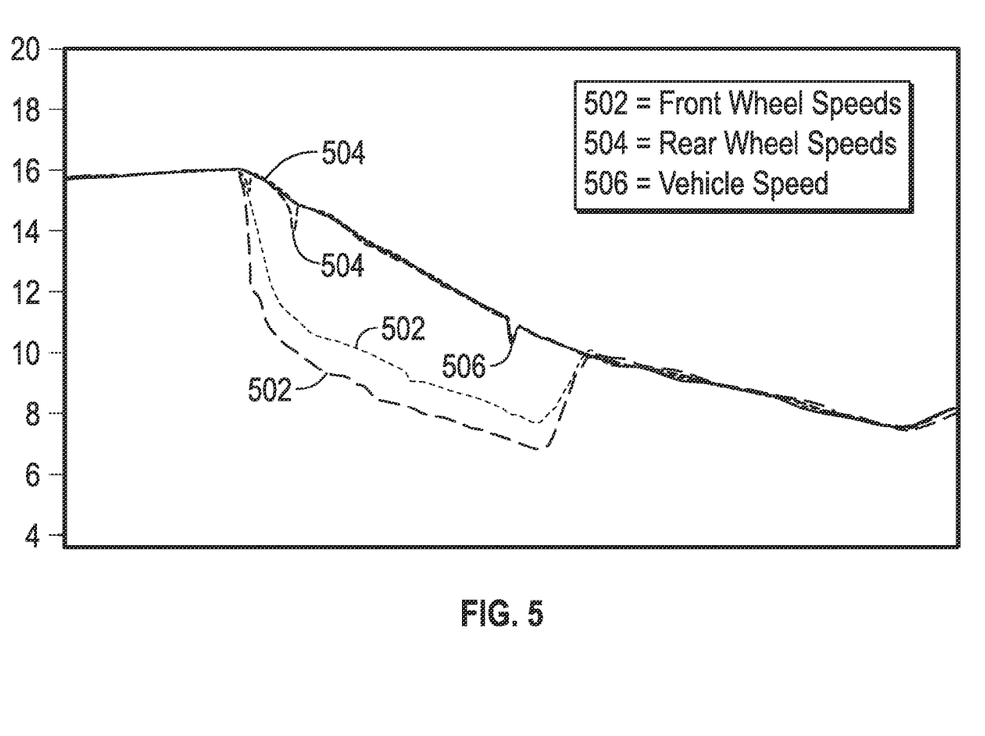
FIG. 5 is a graphical representation of exemplary measurements of front wheel speeds, rear wheel speeds, and overall vehicle speed in an exemplary understeer condition for a vehicle, as referenced with respect to the process of FIG. 2, in accordance with an exemplary embodiment.

For example, with reference to FIG. 5, rear wheel speeds 502, front wheel speeds 504, and an overall vehicle speed 506 are depicted during a vehicle understeer event, with the x-axis representing time (in seconds) and the y-axis representing wheel and vehicle speed (in meters per second). As illustrated in FIG. 5, during a vehicle understeer event, the overall vehicle speed 506 may be more accurately calculated or estimated using the front wheel speeds 504 without the rear wheel speeds 502.

In addition, and returning again to FIG. 2, various vehicle functions (such as vehicle braking, steering, and stability control) may be controlled differently and/or adjusted in light of the understeer information (step 210). For example, during step 210, the vehicle braking, steering, and stability control may be controlled using the adjusted vehicle velocity values described above in connection with step 208. These functions are preferably performed via calculations performed by the processor 120 of FIG. 1 and via instructions provided by the processor 120 of FIG. 1 to the vehicle control units 102 of FIG. 1 that are executed by various non-depicted actuators of the vehicle control units 102 of FIG. 1.

Determinations are also made, preferably continuously, as to whether the vehicle understeer condition has ended (step 212). This determination is preferably made by the processor 120 of FIG. 1 continuously while the vehicle is being operated.

Figure 4:
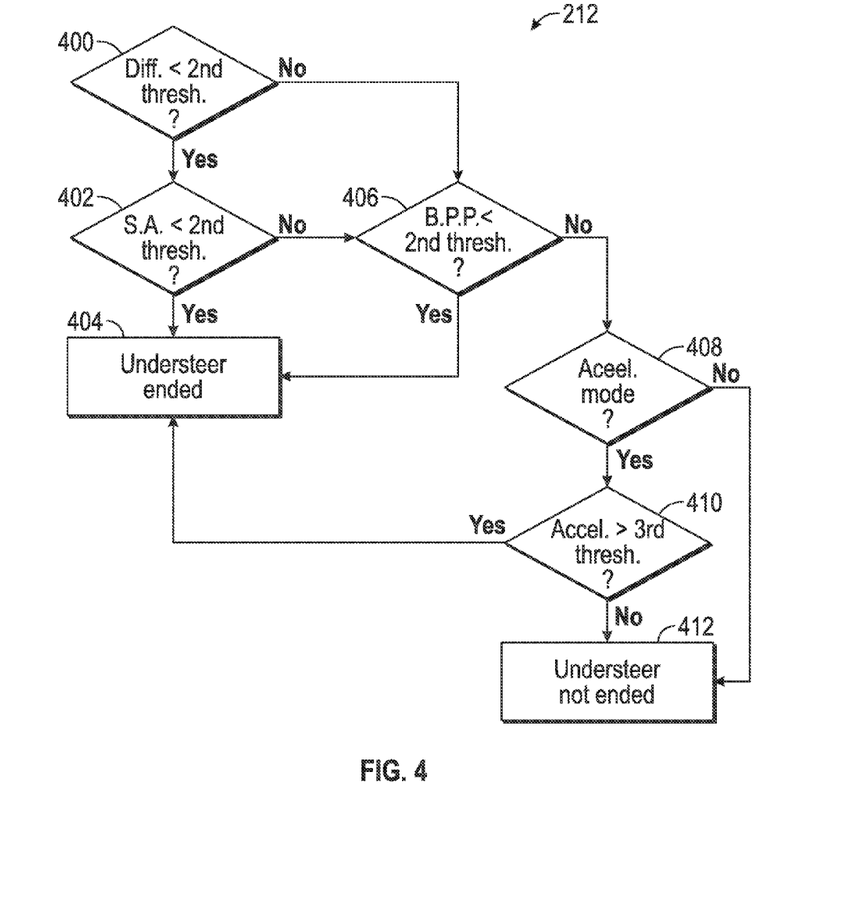
FIG. 4 is a flowchart of another process for another step in the process of FIG. 2, namely the step of determining whether a vehicle understeer condition has indeed, and that can be utilized in connection with the control system of FIG. 1, in accordance with an exemplary embodiment.

Turning now to FIG. 4, an exemplary sub-process is depicted for step 212, determining whether the vehicle understeer condition has ended. As depicted in FIG. 4, the exemplary sub-process for step 212 includes a determination as to whether the difference between the minimum rear wheel speed and the maximum front wheel speed is less than a second predetermined speed threshold (step 400). This threshold preferably comprises a stored value 132 in the memory 122 of FIG. 1. This determination is preferably made by the processor 120 of FIG. 1 continuously during operation of the vehicle. The difference preferably corresponds to the difference of step 310 of FIG. 3, described above. In one preferred embodiment, the second predetermined speed threshold is in a range of between 0 m/s and 1 m/s, and is most preferably approximately equal to 0.3 m/s. However, this may vary.

If it is determined in step 400 that the difference is less than or equal to the second predetermined speed threshold, then a determination is made as to whether the steering angle is less than a second predetermined steering threshold (step 402). This threshold preferably comprises a stored value 132 in the memory 122 of FIG. 1. This determination is preferably made by the processor 120 of FIG. 1 continuously during operation of the vehicle. The steering angle preferably corresponds to the steering angle of step 312 of FIG. 3, described above. In one preferred embodiment, the second predetermined steering threshold is in a range of between 30 degrees and 100 degrees, and is most preferably approximately equal to 50 degrees. However, this may vary.

If it is determined in step 402 that the steering angle is less than the second predetermined steering threshold, then a determination is made that the vehicle understeer condition has ended (step 404). This determination is preferably made by the processor 120 of FIG. 1.

Conversely, if it is determined (i) in step 400 that the difference is greater than the second predetermined speed threshold and/or (ii) in step 402 that the steering angle is greater than or equal to the second predetermined steering threshold, then a determination is made as to whether the brake pedal position is greater than a second predetermined braking threshold (step 406). This determination is preferably made by the processor 120 of FIG. 1 continuously during operation of the vehicle. The brake pedal position preferably corresponds to the brake pedal position of step 314 of FIG. 3, described above. In one preferred embodiment, the second predetermined braking threshold is in a range of between twenty percent and fifty percent of the maximum braking amount (as defined above), and is most preferably approximately equal to thirty percent of the maximum braking amount. However, this may vary. This threshold preferably comprises a stored value 132 in the memory 122 of FIG. 1.

If it is determined in step 406 that the brake pedal position is greater than the second predetermined braking threshold, then the process proceeds to the above-referenced step 404, as a determination is made that the vehicle understeer condition has ended.

Conversely, if it is determined in step 406 that the brake pedal position is less than or equal to the second predetermined braking threshold, then a determination is made as to whether the vehicle is in an accelerating mode (step 408). This determination is preferably made by the processor 120 of FIG. 1 continuously during operation of the vehicle using information provided by one or more transmission sensors 117 of FIG. 1. For example, the vehicle may be determined to be in an accelerating mode if the vehicle is currently being operated in a "drive" transmission gear.

If it is determined in step 408 that the vehicle is in an accelerating mode, then a determination is made as to whether the vehicle acceleration is greater than a third acceleration threshold (step 410). This threshold preferably comprises a stored value 132 in the memory 122 of FIG. 1. This determination is preferably made by the processor 120 of FIG. 1 continuously during operation of the vehicle. The vehicle acceleration preferably corresponds to the vehicle acceleration values of steps 316 and 326 of FIG. 3. The brake pedal position preferably corresponds to the brake pedal position of step 314 of FIG. 3, described above. In one preferred embodiment, the third predetermined acceleration threshold is in a range of between 0.05 g and 0.15 g, and is most preferably approximately equal to 0.1 g. However, this may vary.

If it is determined in step 410 that the vehicle acceleration is greater than the third predetermined acceleration threshold, then the process proceeds to the above-referenced step 404, as the vehicle understeer event is determined to have ended. Conversely, if it is determined (i) in step 408 that the vehicle is not in an accelerating mode and/or (ii) in step 410 that the vehicle acceleration is less than or equal to the third predetermined acceleration threshold, then it is determined instead that the vehicle understeer condition has not yet ended (step 412).

Returning now to FIG. 2, if it is determined in step 212 that the vehicle understeer condition has ended (for example, in step 412 of FIG. 4), then the process returns to the above-referenced step 206, as the various vehicle functions are controlled as normal. The process then returns to step 204, as a new vehicle understeer determination is made at a subsequent time in a new iteration.

Conversely, if it is determined in step 212 that the vehicle understeer condition has not ended (for example, in step 404 of FIG. 4), then the process returns instead to the above-referenced step 210, as the various vehicle functions continue to be controlled in the adjusted fashion in light of the vehicle understeer condition. Steps 210 and 212 preferably repeat, most preferably continuously, until a determination is made an iteration of step 212 that the vehicle understeer condition has ended, at which time the process returns to step 206 as described above. Steps 202-212 (or an applicable subset thereof, as may be appropriate in certain embodiments) preferably repeat so long as the vehicle is being operated.

Accordingly, improved methods, program products, and systems are provided for determining understeer of a vehicle. The improved methods, program products, and systems provide for improved assessment of vehicle understeer conditions utilizing dynamic variables pertaining to the wheels of the vehicle. Specifically, the vehicle understeer condition is determined based on a comparison of front and rear wheel speeds and an analysis of certain other specific dynamic variables pertaining to the wheels and/or to the vehicle as a whole. By doing so, the vehicle understeer determinations may avoid or mitigate distortions that may result from other vehicle understeer determination techniques. When the vehicle understeer is detecting using the disclosed methods and systems, vehicle calculations (such as vehicle velocity) and vehicle control functions (such as braking, steering, and stability control) may be adjusted accordingly in light of the vehicle understeer information.

It will be appreciated that the disclosed methods, systems, and program products may vary from those depicted in the Figures and described herein. For example, as mentioned above, the controller 106 of FIG. 1 may be disposed in whole or in part in any one or more of a number of different vehicle units, devices, and/or systems, and/or one or more other components of the control system 100 of FIG. 1 may vary. In addition, it will be appreciated that certain steps of the process 200 may vary from those depicted in FIGS. 2-4 and/or described herein in connection therewith. It will similarly be appreciated that certain steps of the process 200 may occur simultaneously or in a different order than that depicted in FIGS. 2-4 and/or described herein in connection therewith. It will similarly be appreciated that the disclosed methods, systems, and program products may be implemented and/or utilized in connection with any number of different types of automobiles, sedans, sport utility vehicles, trucks, and/or any of a number of other different types of vehicles, and in controlling any one or more of a number of different types of vehicle infotainment systems.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing the exemplary embodiment or exemplary embodiments. It should be understood that various changes can be made in the function and arrangement of elements without departing from the scope of the invention as set forth in the appended claims and the legal equivalents thereof.

I claim:

1. A method for assessing an understeer of a vehicle having a plurality of front wheels and a plurality of rear wheels, the method comprising the steps of:
   measuring a plurality of rear wheel speeds, each rear wheel speed comprising a wheel speed for a different one of the plurality of rear wheels during a time period;
   measuring a plurality of front wheel speeds, each front wheel speed comprising a wheel speed for a different one of the plurality of front wheels during the time period;
   determining a minimum rear wheel speed value from the plurality of rear wheel speeds, the minimum rear wheel speed value comprising a smallest of the rear wheel speeds during the time period;
   determining a maximum front wheel speed value from the plurality of front wheel speeds, the maximum front wheel speed value comprising a largest of the front wheel speeds during the time period; and
   determining, via a processor, whether the understeer is present using a comparison of the maximum front wheel speed value and the minimum rear wheel speed value.

2. The method of claim 1, wherein:
   the step of determining whether the understeer is present comprises the step of determining that the understeer is present if a difference between the minimum rear wheel speed value and the maximum front wheel speed value is greater than a predetermined speed threshold.

3. The method of claim 1, wherein the understeer is determined to be present provided further that the rear wheel speed is not accelerating greater than an acceleration threshold.

4. The method of claim 1, further comprising the step of:
   measuring a steering angle of the vehicle;
   wherein the understeer is determined to be present provided further that the steering angle is greater than a predetermined steering threshold.

5. The method of claim 1, wherein the vehicle has a brake pedal, and the method further comprises the step of:
   measuring a position of the brake pedal;
   wherein the understeer is determined to be present provided further that the position is less than a predetermined brake threshold.

6. The method of claim 1, wherein the understeer is determined to be present provided further that the vehicle is not accelerating greater than a predetermined acceleration threshold.

7. The method of claim 4, further comprising the step of:
   determining that the understeer for the vehicle has ended if the difference is less than a second predetermined speed threshold and the steering angle is less than a second predetermined steering threshold.

8. The method of claim 5, further comprising the step of:
   determining that the understeer for the vehicle has ended if the position is greater than a second predetermined braking threshold.

9. The method of claim 6, further comprising the step of:
   determining that the understeer for the vehicle has ended if the vehicle is accelerating greater than a second predetermined acceleration threshold.

10. The method of claim 1, wherein:
    the step of measuring the front wheel speed comprises the step of measuring the front wheel speed for each of the plurality of front wheels at a particular point in time during the time period;
    the step of determining the minimum rear wheel speed value comprises determining the minimum rear wheel speed value to be the wheel speed for the rear wheel with the smallest wheel speed of the plurality of rear wheels at the particular point in time during the time period; and
    the step of determining the maximum front wheel speed value comprises determining the maximum front wheel speed value to be the wheel speed for the front wheel with the largest wheel speed of the plurality of front wheels.

11. A system for assessing understeer of a vehicle having a plurality of front wheels and a plurality of rear wheels, the system comprising:
    a plurality of sensors configured to measure a plurality of rear wheel speeds and a plurality of front wheel speeds, each of the rear wheel speeds comprising a wheel speed for a different one of the plurality of rear wheels during a time period, and each of the front wheel front wheel speeds comprising a wheel speed for a different one of the plurality of front wheels during the time period; and
    a processor coupled to the plurality of sensors and configured to:
       determine a minimum rear wheel speed value from the plurality of rear wheel speeds, the minimum rear wheel speed value comprising a smallest of the rear wheel speeds during the time period;
       determine a maximum front wheel speed value from the plurality of front wheel speeds, the maximum front wheel speed value comprising a largest of the front wheel speeds during the time period; and determine whether the understeer is present using a comparison of the maximum front wheel speed value and the rear wheel speed value.

12. The system of claim 11, wherein the processor is further configured to determine that the understeer is present if a difference between the minimum rear wheel speed value and the maximum front wheel speed value is greater than a predetermined speed threshold for at least a predetermined amount of time during the time period.

13. The system of claim 12, wherein the processor is further configured to determine that the understeer is present provided further that the rear wheel speeds are not accelerating greater than an acceleration threshold.

14. The system of claim 12, further comprising:
a steering angle sensor configured to measure a steering angle of the vehicle;
wherein the processor is further configured to determine that the understeer is present provided further that the steering angle is greater than a predetermined steering threshold.

15. The system of claim 12, wherein the vehicle has a brake pedal, and the system further comprises:
a brake pedal position sensor configured to measure a position of the brake pedal;
wherein the processor is further configured to determine that the understeer is present provided further that the position is less than a predetermined brake threshold.

16. The system of claim 12, wherein the processor is further configured to determine that the understeer for the vehicle has ended if conditions (a) and (b) are both satisfied; namely:
(a) the difference is less than a second predetermined speed threshold; and
(b) a position of a brake pedal is greater than a predetermined braking threshold, the vehicle is accelerating greater than a predetermined acceleration threshold, or both.

17. The system of claim 11, wherein:
the plurality of sensors are configured to:
measure the wheel speed for each of the plurality of front wheels; and
measure the rear wheel speed for each of the plurality of rear wheels; and
the processor is configured to:
determine the minimum rear wheel speed value to be the wheel speed for the rear wheel with the smallest wheel speed of the plurality of rear wheels at a particular point in time during the time period; and
determine the maximum front wheel speed value to be the wheel speed for the front wheel with the largest wheel speed of the plurality of front wheels at the particular point in time during the time period.

18. A method for assessing an understeer of a vehicle having at least one front wheel, at least one rear wheel, and a brake pedal, the method comprising the steps of:
measuring a rear wheel speed for the at least one rear wheel;
measuring a front wheel speed for the at least one front wheel;
measuring a position of the brake pedal; and
determining, via a processor, whether the understeer is present using the position of the brake pedal and a comparison of the front wheel speed and the rear wheel speed.

19. The method of claim 18, wherein the step of determining whether the understeer is present comprises:
determining that the understeer is present if a difference between the rear and front wheels speeds is greater than a predetermined threshold wheel speed threshold and the position of the brake pedal is less than a predetermined brake pedal threshold.

20. The method of claim 19, further comprising the step of:
determining that the understeer for the vehicle has ended if the position of the brake pedal is greater than a second predetermined braking threshold.

* * * * *